(12) United States Patent
Pajukoski et al.

(10) Patent No.: US 12,362,849 B2
(45) Date of Patent: Jul. 15, 2025

(54) APPARATUS, METHOD, AND COMPUTER PROGRAM

(71) Applicant: Nokia Technologies Oy, Espoo (FI)

(72) Inventors: Kari Pajukoski, Oulu (FI); Esa Tiirola, Kempele (FI); Sami Hakola, Kempele (FI); Oskari Tervo, Oulu (FI); Benny Vejlgaard, Gistrup (DK); Jorma Kaikkonen, Oulu (FI); Marco Maso, Issy les Moulineaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 778 days.

(21) Appl. No.: 17/763,370

(22) PCT Filed: Oct. 8, 2019

(86) PCT No.: PCT/EP2019/077214
§ 371 (c)(1),
(2) Date: Mar. 24, 2022

(87) PCT Pub. No.: WO2021/069062
PCT Pub. Date: Apr. 15, 2021

(65) Prior Publication Data
US 2022/0360353 A1 Nov. 10, 2022

(51) Int. Cl.
*H04J 13/00* (2011.01)
*H04J 11/00* (2006.01)
(Continued)

(52) U.S. Cl.
CPC ....... *H04J 13/0025* (2013.01); *H04J 11/0076* (2013.01); *H04J 13/107* (2013.01);
(Continued)

(58) Field of Classification Search
CPC .............. H04J 13/0025; H04J 11/0076; H04J 12/107; H04L 5/0007; H04L 26/2613; H04L 27/2614
See application file for complete search history.

(56) References Cited

U.S. PATENT DOCUMENTS

2018/0123849 A1   5/2018   Si et al.
2018/0184390 A1   6/2018   Wu et al.
(Continued)

FOREIGN PATENT DOCUMENTS

CN   107567698 A   1/2018
CN   109075883 A   12/2018
(Continued)

OTHER PUBLICATIONS

"3rd Generation Partnership Project; Technical Specification Group Radio Access Network; NR; Physical channels and modulation (Release 15)", 3GPP TS 38.211, V15.5.0, Mar. 2019, pp. 1-96.
(Continued)

*Primary Examiner* — Samina F Choudhry
(74) *Attorney, Agent, or Firm* — Robert P. Michal, Esq.; Carter, DeLuca & Farrell LLP

(57) ABSTRACT

An apparatus comprising: at least one processor; and at least one memory including computer program code; the at least one memory and the computer program code configured to, with the at least one processor, cause the apparatus at least to: generate (606) a synchronization signal for transmission over one or more symbols, wherein the number of symbols is dependent on a subcarrier spacing.

5 Claims, 8 Drawing Sheets

(51) Int. Cl.
*H04J 13/10* (2011.01)
*H04L 5/00* (2006.01)
*H04L 27/26* (2006.01)

(52) U.S. Cl.
CPC ........ *H04L 5/0007* (2013.01); *H04L 27/2613* (2013.01); *H04L 27/2614* (2013.01); *H04L 27/26025* (2021.01)

(56) References Cited

U.S. PATENT DOCUMENTS

| | | | | |
|---|---|---|---|---|
| 2018/0234931 | A1* | 8/2018 | Ly | H04W 72/30 |
| 2018/0295007 | A1 | 10/2018 | Kumar et al. | |
| 2018/0332551 | A1 | 11/2018 | Liu et al. | |
| 2019/0098580 | A1* | 3/2019 | Babaei | H04W 72/56 |
| 2019/0140689 | A1 | 5/2019 | Wang et al. | |

FOREIGN PATENT DOCUMENTS

| | | | | |
|---|---|---|---|---|
| CN | 109565345 | A | 4/2019 | |
| CN | 110089041 | A | 8/2019 | |
| CN | 110999368 | A * | 4/2020 | ........... H04B 7/0408 |
| KR | 20140098766 | A * | 8/2014 | |
| WO | 2018/102408 | A1 | 6/2018 | |
| WO | 2018/128867 | A1 | 7/2018 | |
| WO | 2018/164420 | A1 | 9/2018 | |
| WO | WO-2018164420 | * | 9/2018 | ............. H04L 27/26 |

OTHER PUBLICATIONS

"Revised SID on Study on NR beyond 52.6GHz", 3GPP TSG RAN Meeting #81, RP-182066, Agenda: 9.3.16, Intel Corporation, Sep. 10-13, 2018, 4 pages.

"New SID on NR waveform beyond 52.6GHz", 3GPP TSG RAN Meeting #79, RP-180453, Agenda: 9.1.2, Qualcomm, Mar. 19-22, 2019, 4 pages.

"New SID: Study on NR design above 52.6GHz", 3GPP TSG RAN Meeting #79, RP-180320, Agenda: 9.1.2, Intel Corporation, Mar. 19-22, 2018, 4 pages.

"Sidelink synchronization mechanisms for NR V2X", 3GPP TSG RAN WG1 Meeting #97, R1-1906012, Agenda: 7.2.4.3, Huawei, May 13-17, 2019, 13 pages.

"Discussion on NR sidelink synchronization mechanism", 3GPP TSG RAN WG1 #96bis Meeting, R1-1905441, Agenda: 7.2.4.3, LG Electronics, Apr. 8-12, 2019, pp. 1-21.

"NR PSS and SSS Design", 3GPP TSG RAN WG1 Meeting RAN1 #88bis, R1-1706156, Agenda: 8.1.1.1.1, Intel Corporation, Apr. 3-7, 2017, pp. 1-27.

International Search Report and Written Opinion received for corresponding Patent Cooperation Treaty Application No. PCT/EP2019/077214, dated Jun. 17, 2020, 14 pages.

Office Action received for corresponding Indian Patent Application No. 202247026396, dated Sep. 9, 2022, 6 pages.

Office Action received for corresponding Chinese Patent Application No. 201980101167.8, dated Mar. 26, 2024, 7 pages of Office Action and English translation, 5 pages, total 12 pages.

"Sidelink synchronization mechanisms for NR V2X", 3GPP TSG RAN WG1 Meeting #98, R1-1908043, Agenda Item: 7.2.4.3, Huawei, Aug. 26-30, 2019, 18 pages.

Indian Application No. 201927001953, "Method For Transmitting Synchronization Signal In Wireless Communication System And Apparatus Therefor", filed on Jan. 16, 2019, pp. 1-32.

Office action received for corresponding Vietnamese Patent Application No. 1-2022-02067, dated Jun. 16, 2022, 1 page of office action and 1 page of translation available.

Notice of Allowance received for corresponding Chinese Patent Application No. 201980101167.8, dated Sep. 23, 2024, 4 pages of Notice of Allowance and No. page of translation available.

Office Action received for corresponding Vietnamese Patent Application No. 1-2022-02067, dated Feb. 28, 2025, 2 pages of Office Action and 1 page of translation available.

\* cited by examiner

| μ | Subcarrier spacing [kHz] | Max BW 4k FFT [Mhz] | Slot length [μs] |
|---|---|---|---|
| 0 | 15 | 50 | 1000 |
| 1 | 30 | 100 | 500 |
| 2 | 60 | 200 | 250 |
| 3 | 120 | 400 | 125 |
| 4 | 240 | 800 | 62.5 |
| 5 | 480 | 1600 | 31.25 |
| 6 | 960 | 3200 | 15.625 |
| 7 | 1920 | 6400 | 7.8125 |
| 8 | 3840 | 12800 | 3.9063 |

FR1: μ=0,1,2
FR2: μ=2,3
\>52.6 GHz: μ=4,5,6,7,8

Fig. 4

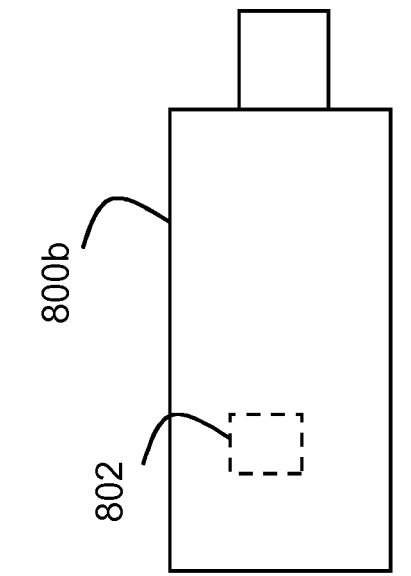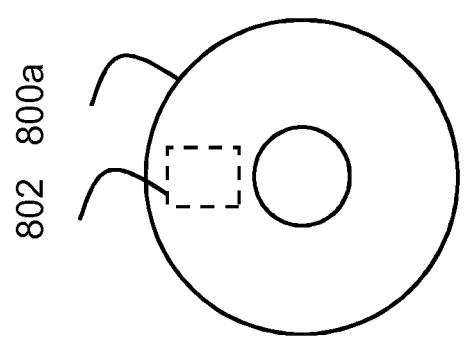
Fig. 8

APPARATUS, METHOD, AND COMPUTER PROGRAM

RELATED APPLICATION

This application claims priority to PCT Application No. PCT/EP2019/077214, filed on Oct. 8, 2019, each of which is incorporated herein by reference in its entirety.

FIELD OF THE DISCLOSURE

The present disclosure relates to an apparatus, a method, and a computer program for generating, transmitting and/or receiving synchronization signals in a cellular network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: generate a synchronization signal for transmission over one or more symbols, wherein the number of symbols is dependent on a subcarrier spacing.

The smaller the subcarrier spacing the smaller the number of symbols may be and the greater the subcarrier spacing the greater the number of symbols may be.

The synchronization signal may comprise one or more sequences.

The one or more sequences may comprise one or more pure m-sequences.

The one or more sequences may be cyclically shifted with one or more cyclic shifts.

The one or more cyclic shifts for the one or more sequences may be selected among one or more sets of one or more cyclic shifts for the one or more sequences.

The number of one or more cyclic shifts within each set of the one or more sets of one or more cyclic shifts for each sequence of the one or more sequences may be the same.

The number of one or more cyclic shifts within each set of the one or more sets of one or more cyclic shifts for each sequence of the one or more sequences may be dependent on the number of the one or more symbols.

The greater the number of the one or more symbols, the smaller the number of the one or more cyclic shifts within each set of the one or more sets of one or more cyclic shifts for each sequence of the one or more sequences may be and the smaller the number of the one or more symbols, the greater the number of the one or more cyclic shifts within each set of the one or more sets of one or more cyclic shifts for each sequence of the one or more sequences may be.

The number of the one or more cyclic shifts within one of the one or more sets of one or more cyclic shifts for one of the one or more sequences may be different from the number of one or more cyclic shifts within a subsequent set one of the one or more sets of a subsequent one of the one or more sequences.

A cyclic shift of one of the one or more sequences may depend on a cyclic shift of a previous one of the one or more sequences.

Some of the one or more sequences may form a reference signal for a physical broadcast channel and/or for a radio resource management measurement.

The at least one memory and the computer program code may be configured to, with the at least one processor, cause the apparatus at least to: transmit the synchronization signal over the one or more symbols.

One of the one or more sequences may be cyclically shifted with a cyclic shift and transmitted over consecutive symbols.

The synchronization signal may be a secondary synchronization signal carrying a secondary synchronization signal identifier.

The secondary synchronization signal identifier may be defined by the one or more sequences and/or the one or more cyclic shifts of the one or more sequences.

The number of symbols may depend on a primary synchronization signal identifier carried by a primary synchronization signal.

The at least one memory and the computer program code may be configured to, with the at least one processor, cause the apparatus at least to: determine the primary synchronization signal identifier and/or the secondary synchronization signal identifier.

The primary synchronization signal identifier and/or the secondary synchronization signal identifier may convey information regarding a physical cell identifier and/or a logical index of a spatial beam.

According to an aspect there is provided an apparatus comprising circuitry configured to: generate a synchronization signal for transmission over one or more symbols, wherein the number of symbols is dependent on a subcarrier spacing.

The smaller the subcarrier spacing the smaller the number of symbols may be and the greater the subcarrier spacing the greater the number of symbols may be.

The synchronization signal may comprise one or more sequences.

The one or more sequences may comprise one or more pure m-sequences.

The one or more sequences may be cyclically shifted with one or more cyclic shifts.

The one or more cyclic shifts for the one or more sequences may be selected among one or more sets of one or more cyclic shifts for the one or more sequences.

The number of one or more cyclic shifts within each set of the one or more sets of one or more cyclic shifts for each sequence of the one or more sequences may be the same.

The number of one or more cyclic shifts within each set of the one or more sets of one or more cyclic shifts for each sequence of the one or more sequences may be dependent on the number of the one or more symbols.

The greater the number of the one or more symbols, the smaller the number of the one or more cyclic shifts within each set of the one or more sets of one or more cyclic shifts for each sequence of the one or more sequences may be and the smaller the number of the one or more symbols, the greater the number of the one or more cyclic shifts within each set of the one or more sets of one or more cyclic shifts for each sequence of the one or more sequences may be.

The number of the one or more cyclic shifts within one of the one or more sets of one or more cyclic shifts for one of the one or more sequences may be different from the number of one or more cyclic shifts within a subsequent set one of the one or more sets of a subsequent one of the one or more sequences.

A cyclic shift of one of the one or more sequences may depend on a cyclic shift of a previous one of the one or more sequences.

Some of the one or more sequences may form a reference signal for a physical broadcast channel and/or for a radio resource management measurement.

The apparatus may comprise circuitry configured to: transmit the synchronization signal over the one or more symbols.

One of the one or more sequences may be cyclically shifted with a cyclic shift and transmitted over consecutive symbols.

The synchronization signal may be a secondary synchronization signal carrying a secondary synchronization signal identifier.

The secondary synchronization signal identifier may be defined by the one or more sequences and/or the one or more cyclic shifts of the one or more sequences.

The number of symbols may depend on a primary synchronization signal identifier carried by a primary synchronization signal.

The apparatus may comprise circuitry configured to: determine the primary synchronization signal identifier and/or the secondary synchronization signal identifier.

The primary synchronization signal identifier and/or the secondary synchronization signal identifier may convey information regarding a physical cell identifier and/or a logical index of a spatial beam.

According to an aspect there is provided an apparatus comprising means for: generating a synchronization signal for transmission over one or more symbols, wherein the number of symbols is dependent on a subcarrier spacing.

The smaller the subcarrier spacing the smaller the number of symbols may be and the greater the subcarrier spacing the greater the number of symbols may be.

The synchronization signal may comprise one or more sequences.

The one or more sequences may comprise one or more pure m-sequences.

The one or more sequences may be cyclically shifted with one or more cyclic shifts.

The one or more cyclic shifts for the one or more sequences may be selected among one or more sets of one or more cyclic shifts for the one or more sequences.

The number of one or more cyclic shifts within each set of the one or more sets of one or more cyclic shifts for each sequence of the one or more sequences may be the same.

The number of one or more cyclic shifts within each set of the one or more sets of one or more cyclic shifts for each sequence of the one or more sequences may be dependent on the number of the one or more symbols.

The greater the number of the one or more symbols, the smaller the number of the one or more cyclic shifts within each set of the one or more sets of one or more cyclic shifts for each sequence of the one or more sequences may be and the smaller the number of the one or more symbols, the greater the number of the one or more cyclic shifts within each set of the one or more sets of one or more cyclic shifts for each sequence of the one or more sequences may be.

The number of the one or more cyclic shifts within one of the one or more sets of one or more cyclic shifts for one of the one or more sequences may be different from the number of one or more cyclic shifts within a subsequent set one of the one or more sets of a subsequent one of the one or more sequences.

A cyclic shift of one of the one or more sequences may depend on a cyclic shift of a previous one of the one or more sequences.

Some of the one or more sequences may form a reference signal for a physical broadcast channel and/or for a radio resource management measurement.

The apparatus may comprise means for: transmitting the synchronization signal over the one or more symbols.

One of the one or more sequences may be cyclically shifted with a cyclic shift and transmitted over consecutive symbols.

The synchronization signal may be a secondary synchronization signal carrying a secondary synchronization signal identifier.

The secondary synchronization signal identifier may be defined by the one or more sequences and/or the one or more cyclic shifts of the one or more sequences.

The number of symbols may depend on a primary synchronization signal identifier carried by a primary synchronization signal.

The apparatus may comprise means for: determining the primary synchronization signal identifier and/or the secondary synchronization signal identifier.

The primary synchronization signal identifier and/or the secondary synchronization signal identifier may convey information regarding a physical cell identifier and/or a logical index of a spatial beam.

According to an aspect there is provided a method comprising: generating a synchronization signal for transmission over one or more symbols, wherein the number of symbols is dependent on a subcarrier spacing.

The smaller the subcarrier spacing the smaller the number of symbols may be and the greater the subcarrier spacing the greater the number of symbols may be.

The synchronization signal may comprise one or more sequences.

The one or more sequences may comprise one or more pure m-sequences.

The one or more sequences may be cyclically shifted with one or more cyclic shifts.

The one or more cyclic shifts for the one or more sequences may be selected among one or more sets of one or more cyclic shifts for the one or more sequences.

The number of one or more cyclic shifts within each set of the one or more sets of one or more cyclic shifts for each sequence of the one or more sequences may be the same.

The number of one or more cyclic shifts within each set of the one or more sets of one or more cyclic shifts for each sequence of the one or more sequences may be dependent on the number of the one or more symbols.

The greater the number of the one or more symbols, the smaller the number of the one or more cyclic shifts within each set of the one or more sets of one or more cyclic shifts for each sequence of the one or more sequences may be and the smaller the number of the one or more symbols, the greater the number of the one or more cyclic shifts within each set of the one or more sets of one or more cyclic shifts for each sequence of the one or more sequences may be.

The number of the one or more cyclic shifts within one of the one or more sets of one or more cyclic shifts for one of the one or more sequences may be different from the number of one or more cyclic shifts within a subsequent set one of the one or more sets of a subsequent one of the one or more sequences.

A cyclic shift of one of the one or more sequences may depend on a cyclic shift of a previous one of the one or more sequences.

Some of the one or more sequences may form a reference signal for a physical broadcast channel and/or for a radio resource management measurement.

The method may comprise: transmitting the synchronization signal over the one or more symbols.

One of the one or more sequences may be cyclically shifted with a cyclic shift and transmitted over consecutive symbols.

The synchronization signal may be a secondary synchronization signal carrying a secondary synchronization signal identifier.

The secondary synchronization signal identifier may be defined by the one or more sequences and/or the one or more cyclic shifts of the one or more sequences.

The number of symbols may depend on a primary synchronization signal identifier carried by a primary synchronization signal.

The method may comprise: determining the primary synchronization signal identifier and/or the secondary synchronization signal identifier.

The primary synchronization signal identifier and/or the secondary synchronization signal identifier may convey information regarding a physical cell identifier and/or a logical index of a spatial beam.

According to an aspect there is provided a computer program comprising computer executable code which when run on at least one processor is configured to: generate a synchronization signal for transmission over one or more symbols, wherein the number of symbols is dependent on a subcarrier spacing.

The smaller the subcarrier spacing the smaller the number of symbols may be and the greater the subcarrier spacing the greater the number of symbols may be.

The synchronization signal may comprise one or more sequences.

The one or more sequences may comprise one or more pure m-sequences.

The one or more sequences may be cyclically shifted with one or more cyclic shifts.

The one or more cyclic shifts for the one or more sequences may be selected among one or more sets of one or more cyclic shifts for the one or more sequences.

The number of one or more cyclic shifts within each set of the one or more sets of one or more cyclic shifts for each sequence of the one or more sequences may be the same.

The number of one or more cyclic shifts within each set of the one or more sets of one or more cyclic shifts for each sequence of the one or more sequences may be dependent on the number of the one or more symbols.

The greater the number of the one or more symbols, the smaller the number of the one or more cyclic shifts within each set of the one or more sets of one or more cyclic shifts for each sequence of the one or more sequences may be and the smaller the number of the one or more symbols, the greater the number of the one or more cyclic shifts within each set of the one or more sets of one or more cyclic shifts for each sequence of the one or more sequences may be.

The number of the one or more cyclic shifts within one of the one or more sets of one or more cyclic shifts for one of the one or more sequences may be different from the number of one or more cyclic shifts within a subsequent set one of the one or more sets of a subsequent one of the one or more sequences.

A cyclic shift of one of the one or more sequences may depend on a cyclic shift of a previous one of the one or more sequences.

Some of the one or more sequences may form a reference signal for a physical broadcast channel and/or for a radio resource management measurement.

The computer program may comprise computer executable code which when run on at least one processor is configured to: transmit the synchronization signal over the one or more symbols.

One of the one or more sequences may be cyclically shifted with a cyclic shift and transmitted over consecutive symbols.

The synchronization signal may be a secondary synchronization signal carrying a secondary synchronization signal identifier.

The secondary synchronization signal identifier may be defined by the one or more sequences and/or the one or more cyclic shifts of the one or more sequences.

The number of symbols may depend on a primary synchronization signal identifier carried by a primary synchronization signal.

The computer program may comprise computer executable code which when run on at least one processor is configured to: determine the primary synchronization signal identifier and/or the secondary synchronization signal identifier.

The primary synchronization signal identifier and/or the secondary synchronization signal identifier may convey information regarding a physical cell identifier and/or a logical index of a spatial beam.

According to an aspect there is provided an apparatus comprising at least one processor and at least one memory including computer code for one or more programs, the at least one memory and the computer code configured, with the at least one processor, to cause the apparatus at least to: receive a synchronization signal over one or more symbols, wherein the number of symbols is dependent on a subcarrier spacing.

The synchronization signal may comprise one or more sequences.

The one or more sequences may comprise one or more pure m-sequences.

Receiving a synchronization signal over one or more symbols may comprise: determining cyclic shifts of the one or more sequences.

The synchronization signal may be a secondary synchronization signal carrying a secondary synchronization signal identifier.

Receiving a synchronization signal over one or more symbols may comprise: determining the secondary synchronization signal identifier based on the cyclic shifts.

The at least one memory and the computer program code may be configured to, with the at least one processor, cause the apparatus at least to: receive a primary synchronization signal carrying a primary synchronization signal identifier; and determine the primary synchronization signal identifier.

The at least one memory and the computer program code may be configured to, with the at least one processor, cause the apparatus at least to: determine the number of the one or more symbols based on the primary synchronization signal identifier.

The at least one memory and the computer program code may be configured to, with the at least one processor, cause the apparatus at least to: determine a physical cell identifier using the primary synchronization signal identifier and the secondary synchronization signal identifier.

The at least one memory and the computer program code may be configured to, with the at least one processor, cause the apparatus at least to: determine a logical index of a spatial beam using the primary synchronization signal identifier and the secondary synchronization signal identifier.

According to an aspect there is provided an apparatus comprising circuitry configured to: receive a synchronization signal over one or more symbols, wherein the number of symbols is dependent on a subcarrier spacing.

The synchronization signal may comprise one or more sequences.

The one or more sequences may comprise one or more pure m-sequences.

Receiving a synchronization signal over one or more symbols may comprise: determining cyclic shifts of the one or more sequences.

The synchronization signal may be a secondary synchronization signal carrying a secondary synchronization signal identifier.

Receiving a synchronization signal over one or more symbols may comprise: determining the secondary synchronization signal identifier based on the cyclic shifts.

The apparatus may comprise circuitry configured to: receive a primary synchronization signal carrying a primary synchronization signal identifier; and determine the primary synchronization signal identifier.

The apparatus may comprise circuitry configured to: determine the number of the one or more symbols based on the primary synchronization signal identifier.

The apparatus may comprise circuitry configured to: determine a physical cell identifier using the primary synchronization signal identifier and the secondary synchronization signal identifier.

The apparatus may comprise circuitry configured to: determine a logical index of a spatial beam using the primary synchronization signal identifier and the secondary synchronization signal identifier.

According to an aspect there is provided an apparatus comprising means for: According to an aspect there is provided a method comprising: receiving a synchronization signal over one or more symbols, wherein the number of symbols is dependent on a subcarrier spacing.

The synchronization signal may comprise one or more sequences.

The one or more sequences may comprise one or more pure m-sequences.

Receiving a synchronization signal over one or more symbols may comprise: determining cyclic shifts of the one or more sequences.

The synchronization signal may be a secondary synchronization signal carrying a secondary synchronization signal identifier.

Receiving a synchronization signal over one or more symbols may comprise: determining the secondary synchronization signal identifier based on the cyclic shifts.

The apparatus may comprise means for: receiving a primary synchronization signal carrying a primary synchronization signal identifier; and determine the primary synchronization signal identifier.

The apparatus may comprise means for: determining the number of the one or more symbols based on the primary synchronization signal identifier.

The apparatus may comprise means for: determining a physical cell identifier using the primary synchronization signal identifier and the secondary synchronization signal identifier.

The apparatus may comprise means for: determining a logical index of a spatial beam using the primary synchronization signal identifier and the secondary synchronization signal identifier.

According to an aspect there is provided a computer program comprising computer executable code which when run on at least one processor is configured to: receiving a synchronization signal over one or more symbols, wherein the number of symbols is dependent on a subcarrier spacing.

The synchronization signal may comprise one or more sequences.

The one or more sequences may comprise one or more pure m-sequences.

Receiving a synchronization signal over one or more symbols may comprise: determining cyclic shifts of the one or more sequences.

The synchronization signal may be a secondary synchronization signal carrying a secondary synchronization signal identifier.

Receiving a synchronization signal over one or more symbols may comprise: determining the secondary synchronization signal identifier based on the cyclic shifts.

The method may comprise: receiving a primary synchronization signal carrying a primary synchronization signal identifier; and determine the primary synchronization signal identifier.

The method may comprise: determining the number of the one or more symbols based on the primary synchronization signal identifier.

The method may comprise: determining a physical cell identifier using the primary synchronization signal identifier and the secondary synchronization signal identifier.

The method may comprise: determining a logical index of a spatial beam using the primary synchronization signal identifier and the secondary synchronization signal identifier.

According to an aspect there is provided a computer program comprising computer executable code which when run on at least one processor is configured to: receive a synchronization signal over one or more symbols, wherein the number of symbols is dependent on a subcarrier spacing.

The synchronization signal may comprise one or more sequences.

The one or more sequences may comprise one or more pure m-sequences.

Receiving a synchronization signal over one or more symbols may comprise: determining cyclic shifts of the one or more sequences.

The synchronization signal may be a secondary synchronization signal carrying a secondary synchronization signal identifier.

Receiving a synchronization signal over one or more symbols may comprise: determining the secondary synchronization signal identifier based on the cyclic shifts.

The computer program may comprise computer executable code which when run on at least one processor is configured to: receive a primary synchronization signal carrying a primary synchronization signal identifier; and determine the primary synchronization signal identifier.

The computer program may comprise computer executable code which when run on at least one processor is configured to: determine the number of the one or more symbols based on the primary synchronization signal identifier.

The computer program may comprise computer executable code which when run on at least one processor is configured to: determine a physical cell identifier using the primary synchronization signal identifier and the secondary synchronization signal identifier.

The computer program may comprise computer executable code which when run on at least one processor is configured to: determine a logical index of a spatial beam using the primary synchronization signal identifier and the secondary synchronization signal identifier.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

AF: Application Function
AUSF: Authentication Server Function
AMF: Access Management Function
BPSK: Binary Phase Shift Keying
BWP: BandWidth Part
CDF: Cumulative Distribution Function
CP: Cyclic Prefix
CU: Centralized Unit
DMRS: DeModulation Reference Signal
DN: Data Network
DU: Distributed Unit
FFT: Fast Fourier Transform
FR1: Frequency Range 1
FR2: Frequency Range 2
GNB: gNodeB
GSM: Global System for Mobile communication
HSS: Home Subscriber Server
ID: Identifier
IFFT: Inverse Fast Fourier Transform
IoT: Internet of Things
IP: Internet Protocol
L1-RSRP: Layer 1 Reference Signal Received Power
LTE: Long Term Evolution
NEF: Network Exposure Function
NR: New Radio
MS: Mobile Station
MTC: Machine Type Communication
OFDM: Orthogonal Frequency Division Multiplexing
PA: Power Amplifier
PAR: Peak to Average Ratio
PBCH: Physical Broadcast CHannel
PCI: Physical Cell Identifier
PRB: Physical Resource Block
PSS: Primary Synchronization Signal
RAM: Random Access Memory
RAN: Radio Access Network
RF: Radio Frequency
ROM: Read Only Memory
RRM: Radio Resource Management
SCS: SubCarrier Spacing
SI: Study Item
SMF: Session Management Function
SSB: Synchronization Signal Block
SSS: Secondary Synchronization Signal
UDM: User Data Management
UE: User Equipment
UMTS: Universal Mobile Telecommunication System
USB: Universal Serial Bus
V2X: Vehicle to everything
3GPP: $3^{rd}$ Generation Partnership Project
5G: 5th Generation
5GC: 5G Core network
5GRAN: 5G Radio Access Network
5GS: 5G System

BRIEF DESCRIPTION OF THE FIGURES

Embodiments will now be described, by way of example only, with reference to the accompanying Figures in which:

FIG. 4 shows a schematic representation of transmission numerologies for frequency carriers below 52.6 GHz and above 52.6 GHz;

FIG. 8 shows a schematic representation of a non-volatile memory medium storing instructions which when executed by a processor allow a processor to perform one or more of the steps of the method of any of FIGS. 6 and 7.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
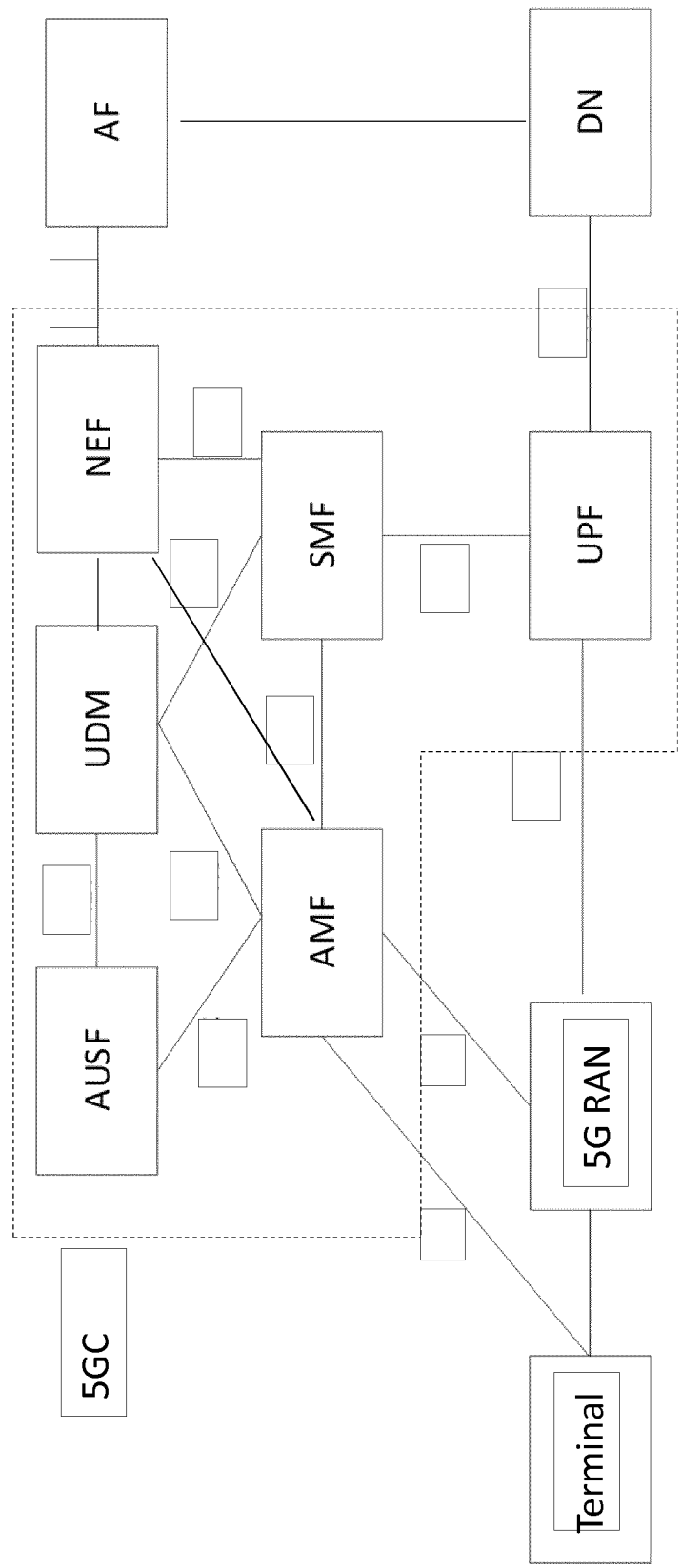
FIG. 1 shows a schematic representation of a 5G system (5GS)

FIG. 1 shows a schematic representation of a 5G system (5GS). The 5GS may comprises a terminal, a 5G radio access network (5GRAN), a 5G core network (5GC), one or more application function (AF) and one or more data networks (DN).

The 5GRAN may comprise one or more gNodeB (GNB) distributed unit functions connected to one or more gNodeB (GNB) centralized unit functions.

The 5GC may comprise an access management function (AMF), a session management function (SMF), an authentication server function (AUSF), a user data management (UDM), a user plane function (UPF) and/or a network exposure function (NEF).

Figure 2:
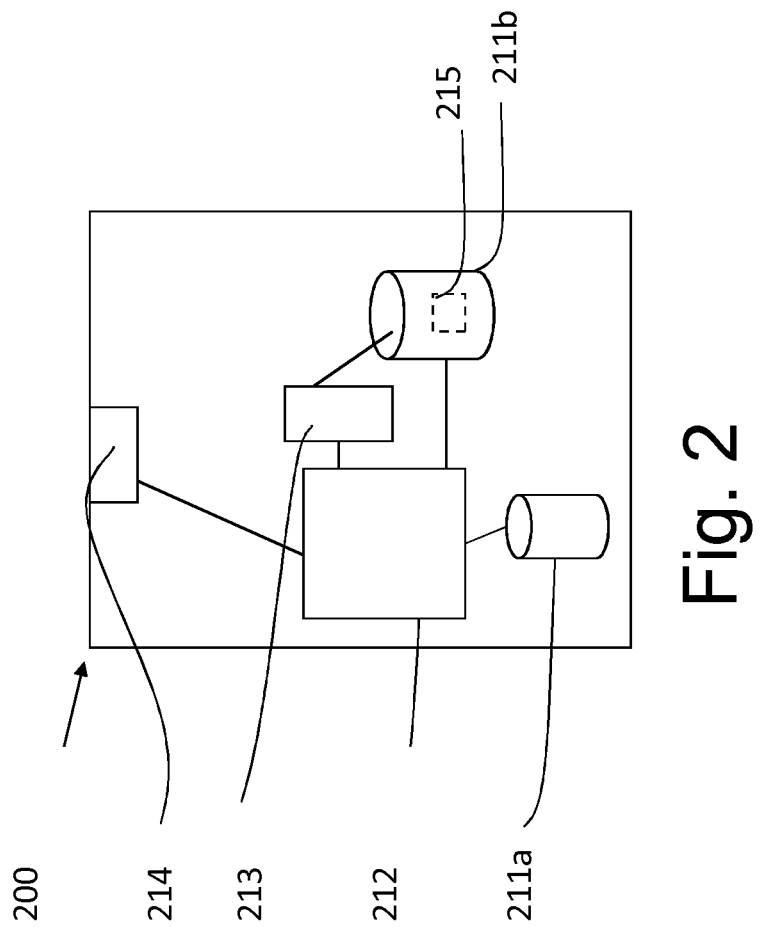
FIG. 2 shows a schematic representation of a control apparatus.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
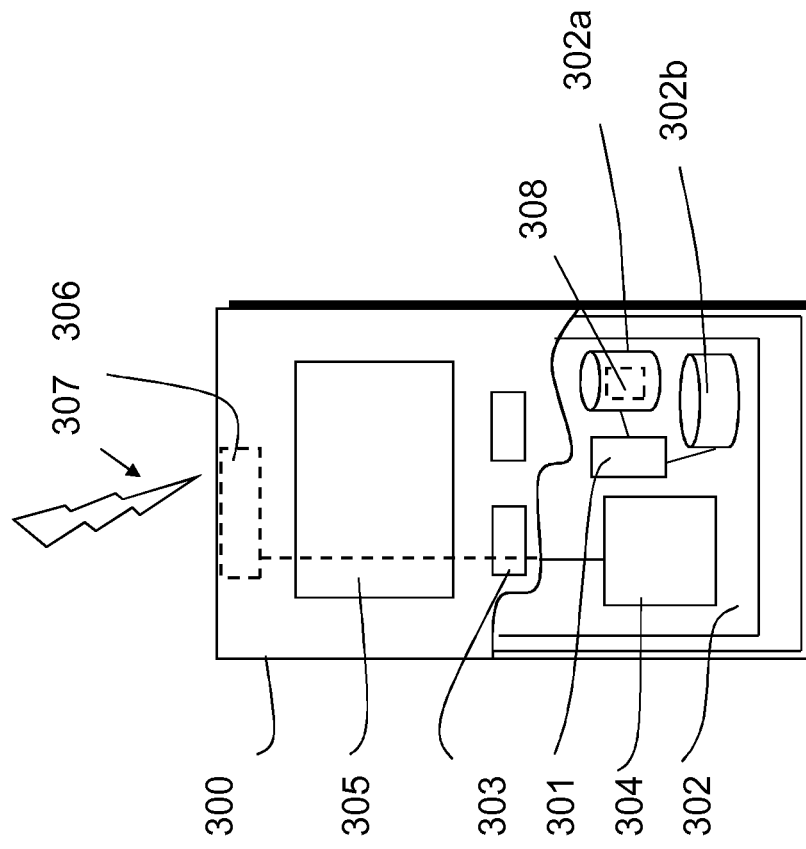
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 302b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

One or more of the following aspects relate to 5GS. However, it will be understood that similar aspects may relate to other systems.

One or more of the following aspects relate to secondary synchronization signals (SSS) design for operation on frequency carriers above 52.6 GHz. However, it will be understood that similar aspects may relate to other synchronization signals and/or for synchronization signals on frequency carriers in another frequency range.

New radio (NR) Rel-15 defines operation on frequency carriers up to 52.6 GHz and accordingly the physical layer channels have been designed and optimized for frequency carriers up to 52.6 GHz. Frequency carriers above 52.6 GHz may contain large spectrum allocations and may support many high capacity use cases.

Spectrum allocations, use cases, deployment scenarios and requirements for operation on frequency carriers above 52.6 GHz are currently being discussed in $3^{rd}$ generation partnership project (3GPP) radio access network (RAN) as part of a RAN-lead study item (SI) and will eventually be standardized in Rel-17 or Rel-18 time-frame.

"RP-182066 Revised SID on Study on NR beyond 52.6 Ghz" discusses spectrum allocations for operation on frequency carriers above 52.6 GHz.

Potential high mm-wave bands for 5G and beyond systems may be: 70 GHz to 114 GHz, 80 GHz to 114 GHz or 92 GHz to 114 GHz.

"RP-180453 New SID on NR waveform beyond 52.6 GHz" and "RP-180320 Study on NR design for above 52.6 Hz" discusses waveform design for operation on frequency carriers above 52.6 GHz and physical layer design for operation on frequency carriers above 52.6 GHz.

The waveform design and/or physical layer design may take into consideration one or more of the following aspects: efficient transceiver design including power efficiency and complexity, improvement of coverage to cope with extreme propagation loss and inheriting physical layer channel design for operation on frequency carriers below 52.6 GHz from NR Rel-15 work item (WI) whenever applicable.

The next generation of systems operating on frequency carriers above 52.6 GHz may have to cope with increased path loss, larger antenna arrays, and less efficient radio frequency (RF) components like power amplifiers (PAs). Hence these systems may be more noise limited especially at cell edge which may drive the need to obtain more power from the PAs. Low peak to average ratio (PAR) waveforms may be preferred for all channels because they allow the PAs to operate at a higher power to maintain coverage.

In cellular network, such as a 5G cellular network, a base station may broadcast synchronization signals to allow a terminal to acquire frame timing and to acquire a physical cell identifier (PCI). The synchronization signals may comprise a primary synchronization signal (PSS) and a secondary synchronization signal (SSS).

The PSS may be transmitted over one orthogonal frequency duplex multiplexing (OFDM) symbol reserved for PSS and hundred and twenty seven subcarriers. The PSS may be used for initial symbol timing and frequency synchronization to the cell.

The SSS may also be transmitted over one OFDM symbol reserved for SSS and hundred and twenty seven subcarriers The SSS may be used together with the PSS to carry the PCI. The SSS may also be used for cell level radio resource management (RRM) measurements and/or for intra-cell synchronization signal block (SSB) beam measurements, such as layer 1 (i.e. physical layer) reference signal received power (L1-RSRP).

It will be understood that the sequence length and therefore the number of carriers for PSS and/or SSS is not necessarily equal to hundred and twenty seven. It may be smaller than hundred and twenty seven or greater than hundred and twenty seven, for example for NR evolution.

In some implementations, the PSS may comprise a single sequence transmitted over a single OFDM symbol. The sequence may be constructed based on a frequency domain length-127 binary phase shift keying (BPSK) modulated m-sequence. The generated m-sequence may further be cyclically shifted by one of three possible cyclic shifts (e.g. 0, 43 or 86 steps) to obtain one of three possible PSS sequences carrying one of three possible PSS identifiers (PSS ID) (e.g. 0, 1, 2). The PSS ID defines an index of cell identifier in a cell identifier group.

It will be understood that the number of possible cyclic shifts is not necessarily equal to three. It may be smaller than three or greater than three, for example in future systems.

The SSS may comprise multiple sequences transmitted over a single OFDM symbol reserved for SSS. The sequences may be constructed based on an element-wise multiplication of two frequency domain length-127 BPSK modulated m-sequences shifted with different cyclic shifts. There may be one m-sequence shifted with one of hundred and twelve cyclic shifts and another m-sequence shifted with one of three cyclic shifts forming together three hundred and thirty six possible sequences (i.e. 112×3=336) and therefore three hundred and thirty six possible SSS identifiers (SSS ID) (e.g. 0, 1, . . . , 335). The SSS ID defines cell identity groups. The PSS ID and the SSS ID together form one of a thousand and eight PCIs (i.e. 3×336=1008).

The PCI may be expressed as follows, where:
SSS ID defines the cell identifier group (e.g. 0, 1, . . . , 335), and PSS ID defines the index of cell identifier (e.g. 0, 1, 2) in the cell identifier group.

PCI=3×SSS ID+PSS ID

Support for multiple transmission numerologies is one feature in NR. Table 4.2-1 captured from TS 38.211 shows the transmission numerologies supported by NR and associated subcarrier spacing (SCS) and cyclic prefix (CP), where µ designates a transmission numerology and Δf designates the SCS.

| µ | $\Delta f = 2^{\mu} \cdot 15 [kHz]$ | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

It has been observed that using a larger SCS may lead to one or more of the following: larger carrier bandwidth for a given fast fourier transform (FFT) size, smaller symbol duration and potentially lower latency, smaller channel access overhead due to finer-granularity slot design, reduced sensitivity to phase noise, and reduced cyclic prefix (CP) length.

NR Rel-15 may support bandwidth part (BWP) size up to two hundred and seventy five physical resource blocks (PRB). This means that the maximum BWP size according to NR Rel-15 may be 396 MHz (i.e. 0.12×12×275=396). Indeed, 120 kHz SCS may be the largest possible SCS for frequency carriers below 52.6 GHz and the frequency carriers may comprise twelve frequency subcarriers. 240 kHz SCS can be used for SSB only.

This may not be enough for frequency carriers above 52.6 GHz where channel bandwidth can be as high as 10 GHz. Additionally, phase noise may also be increased. Larger SCS may be introduced to tackle phase noise, and to provide larger carrier bandwidth with reasonable FFT size. This can be achieved by extending the transmission numerology scaling framework defined in NR Rel-15 to support additional transmission numerologies µ as showed on FIG. 4.

The transmission numerologies µ may determine the SCS, the IFFT/FFT block length and the clock rate related to LTE. For example, there may be $2^\mu$ scaling of SCS, IFFT/FFT block length $2^\mu$ and clock rate $2^\mu$ related to LTE.

The SCS for the PSS or the SSS may depend on different frequency ranges. For example, for a frequency range 1 (FR1) the SCS may be 15 kHz, 30 kHz or 60 kHz. For a frequency range 2 (FR2) the SCS may be 60 kHz or 120 kHz. For a frequency range above 52.6 GHz the SCS may be 240 kHz, 480 kHz, 960 kHz, 1920 kHz or 3840 kHz (or a subset of those).

The SCS for data signals may also depend on different frequency ranges. For example, for sub-6 GHz the SCS may be 15 kHz or 30 kHz or 60 kHz whereas for above-6 GHz the SCS may be 60 kHz or 120 kHz.

As per "RP-182066 Revised SID on Study on NR beyond 52.6 Ghz", the physical layer channel design for above 52.6 GHz may inherit the physical layer channel design for below 52.6 GHz from NR Rel-15 work item (WI) whenever applicable. Coverage of NR Rel-15 synchronization signals may be limited by the structure of Rel-15 SSS for applications above 52.6 GHz. This may be due to the fact that PAs may produce less power for SSS compared to PSS due to higher PAR of the SSS.

As explained above, in some implementations the PSS may comprise one of three possible sequences transmitted over one OFDM symbol reserved for PSS and a hundred a twenty seven subcarriers. The PAR for PSS may be 5.7 dB, 5.0 dB or 4.5 dB.

Figure 5:
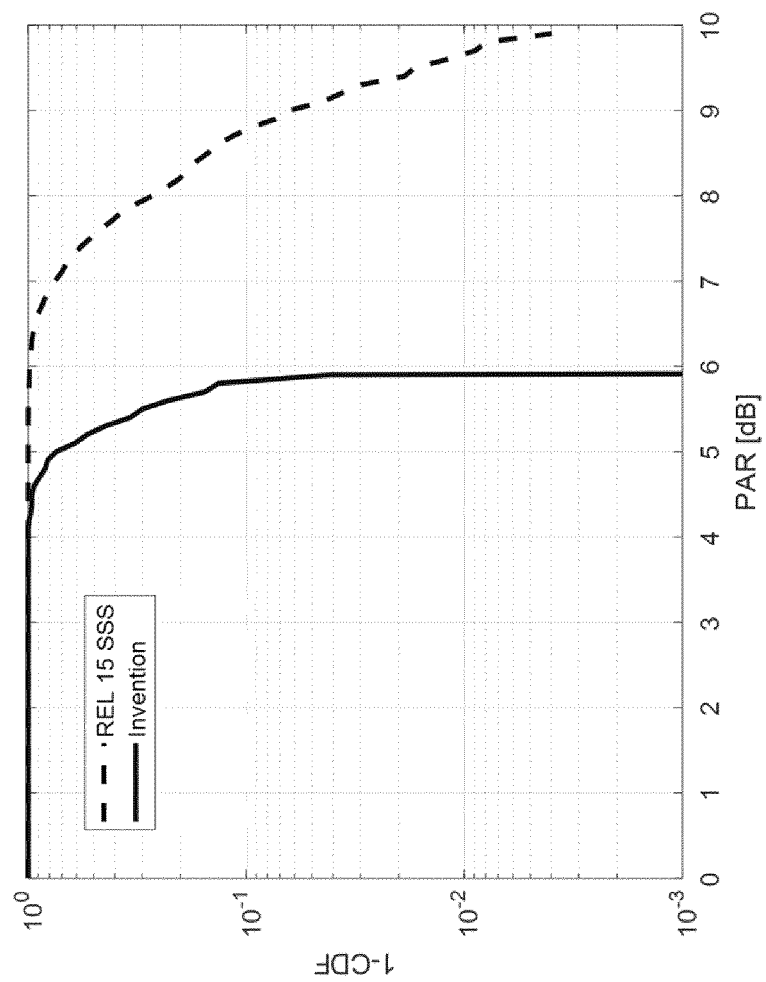
FIG. 5 shows a schematic representation of a peak to average ratio for a secondary synchronization signal.

The SSS may comprise one of a thousand and eight possible sequences transmitted over one OFDM symbol and a hundred a twenty seven subcarriers. The PAR for SSS may vary between 6 dB and 10 dB as showed on FIG. 5. In other words, the PAR for SSS may be up to 4 dB higher than PAR for PSS (4 dB may refer to a difference in 1% cumulative distribution function (CDF)).

On the other hand, there may be a desire to reuse the same sites for different mmWave radios. However, the link budget difference between SCS 240 kHz (a typical PSS or SSS SCS for FR2) and 1920 kHz (one of the possible candidate values for the SCS of PSS or SSS for frequency carriers above 52.6 GHz) is as high as 9 dB (i.e. 10×log 10(1920/240)=9 dB). This already implies almost a ten-fold loss in coverage, which may be unacceptable for a network to operate correctly.

Furthermore, the number of PCIs may be limited with the small cell deployment for frequency carriers above 52.6 GHz.

In LTE vehicle to everything (V2X) side link (SL) synchronization signal design, the number of OFDM symbols reserved for PSS and OFDM symbols reserved for SSS may be two to increase the coverage. Correspondingly, the number of SL-PSS and SL-SSS symbols has been discussed for the NR SL-SSB design. In this context, it has been agreed that the number of OFDM symbols used for SL-PSS and SL-SSS may be increased (as compared to NR-Uu) from one to two for all values of SCS. In addition, it has been considered to have the same or a different sequence in each of the symbols, in case of both SL-PSS (R1-1906012) and SL-SSS (R1-1905441).

One or more of the following aspects relate to SSS design for frequency carriers above 52.6 GHz. The SSS may be split into several OFDM symbols by using pure m-sequences instead of multiplied ones. The number of OFDM symbols used for SSS may depend on the SCS such that higher SCS values may entail a larger number of OFDM symbols used for SSS to compensate for the coverage loss due to shorter symbol duration.

According to an aspect, the number of OFDM symbols used for SSS may depend on the subcarrier spacing as follows:
  240 kHz: 1 OFDM symbol (reference)
  480 kHz: 2 OFDM symbols
  960 kHz: 4 OFDM symbols
  3840 kHz: 16 OFDM symbols
  etc.

According to an aspect, the sequences may be constructed based on cyclically shifted m-sequences. For example, a first OFDM symbol of a two OFDM symbol length SSS may comprise one m-sequence with one of nineteen possible cyclic shifts and a second OFDM symbol of the two OFDM symbol length SSS may comprise another m-sequence with one of nineteen possible cyclic shifts. Hence, the SSS ID may be one of a thousand and eight possible SSS IDs. The PCI formed by the PSS ID and the SSS ID may be one of a thousand and eighty three PCIs (i.e. 3*361=1083).

According to an aspect, all the PCIs (e.g. 1083) may be used as valid PC's. Alternatively, only a set of all the PCIs (e.g. <1083) may be used as valid PC's. The set may be selected in a predefined manner based on a predefined criterion (e.g. PAR or cyclic shift difference—for example the set may comprise the PCIs with the lowest PARs or the set may comprise the PCIs with the longest cyclic shift differences).

The number of possible cyclic shifts of each m-sequence may decrease as the number of OFDM symbols used for the SSS grows. For example, with a SCS of 960 kHz the number of possible cyclic shifts of each m-sequence may be three (e.g., 0, 43 and 86). By contrast, with a SCS of 1920 kHz or 3840 kHz the number of possible cyclic shifts of each m-sequence may be less than three. Hence, with a SCS of 960 kHz the SSS ID may be one of a thousand and eight possible SSS IDs ($3^6$=729—assuming the SSS is transmitted over six OFDM symbols in the example). The PCI formed by the PSS ID and the SSS ID may be one of two thousand one hundred and eighty seven PCIs (3*729=2187).

According to an aspect, the number of cyclic shifts for each m-sequence may not be constant. For example, with a SCS of 960 kHz the first five first OFDM symbols may carry an m-sequence shifted with one of three possible cyclic shifts and the last OFDM symbol may carry an m-sequence shifted with one of two possible cyclic shifts. Hence, with a SCS of 960 kHz the SSS ID may be one of a thousand and eight possible SSS IDs (i.e. $3^5$*2=486). The PCI formed by the PSS ID and the SSS ID may be one of two thousand one hundred and eighty seven PCIs (i.e. 3*486=1458).

According to an aspect, one or more predefined m-sequences may be repeated in consecutive OFDM symbols used for SSS and preferably while keeping the same cyclic shift. This may be used as a way to improve the coverage of the m-sequences.

According to an aspect, the number of m-sequences concatenated may depends on the SCS and thus on the number of OFDM symbols used for SSS. This may enable a large numbers of PC's. For example, the greater the number of OFDM symbols used for SSS, the greater the number of m-sequences concatenated. Alternatively, the smaller the number of OFDM symbols used for SSS, the smaller the number of m-sequences concatenated. For example, if the number of OFDM symbols used for SSS is equal to eight the number of m-sequences concatenated may be equal to eight. If the number of OFDM symbols used for SSS is equal to four the number of m-sequences concatenated may be equal to four.

According to an aspect, the number of OFDM symbols used for SSS (and therefore the number of OFDM symbols that a terminal may expect to be used for SSS) may be dependent on the PSS ID. For instance, for a given SCS, the detected PSS ID may be used to determine how many OFDM symbols are used for SSS.

According to an aspect, a detected m-sequence may be used to determine how many OFDM symbols are used for SSS. A detected m-sequence in an OFDM symbol used for SSS may determine how many subsequent OFDM symbols are used for SSS.

According to an aspect, a detected m-sequence in an OFDM symbol used for SSS may determine whether a subsequent OFDM symbols is used for SSS.

According to an aspect, the PSS ID carried by the PSS and the SSS ID carried by the SSS may convey information regarding a logical index of a spatial beam used.

According to an aspect, the cyclic shift of an nth m-sequence transmitted over an n-1th OFDM symbol used for SSS may depend on a cyclic shift of an n-1th cyclic shift transmitted over an n-1th OFDM symbol used for SSS. For example, there may be one m-sequence in nth SSS symbol shifted with one of six cyclic shift (e.g., 0, 13,26,39,52,65) and another m-sequence in n-1th SSS symbol shifted with one of three cyclic shifts (e.g., 0, 43 and 86). If the m-sequence in n-1th SSS symbol is shifted by 0, the m-sequence in the nth SSS symbol may be shifted only by 0 or 13. If the m-sequence in the n-1th SSS symbol is shifted by 43 nth SSS symbol may be shifted only by 26 or 39.

According to an aspect, the last k m-sequences of a set of m-sequences transmitted over a set of OFDM symbols used for SSS may be used as a reference signal (RS), such as a demodulation reference signal (DMRS) for the physical broadcast channel (PBCH) and/or for cell level radio resource management (RRM) measurements for instance, where k is an integer greater than or equal to 1. This may provide enough "separability" for the RS towards other cells' SSS when used for DMRS and cell level measurements.

According to an aspect, a terminal may first detect the PSS. Based on the detected PSS, and the predefined rules/parameters, the terminal may locate the resource elements (e.g. OFDM symbols location and/or frequency subcarriers) used for SSS. The terminal may determine the cyclic shift for each m-sequence transmitted over each OFDM symbol used for SSS. The SSS ID may be detected based on the detected cyclic shift m-sequence transmitted over each OFDM symbol used for SSS in the following way (this assumes that repetition is not applied for the m-sequences), where:

M is the number of OFDM symbols used for SSS,
m is one of the OFDM symbols used for SSS, m=0, 1, . . . , M−1
C(m) is the number is the number of possible cyclic shifts for the OFDM symbol m used for SSS, and
c(m) is the detected cyclic shift of the OFDM symbol m-1 used for SSS.

$$SSSID = \sum_{m=0}^{M-2}\left(c(m)\left(\sum_{n=m+1}^{M-1} C(n)\right)\right) + c(M)$$

The PCI may be detected based on the detected PSS ID and the detected SSS ID in the following way, where:
P is the number of possible PSS IDs carried by PSS, and PSS ID is the PSS ID carried by PSS, PSS ID=0, 1, (P−1).

PCI=P×SSS ID+PSS ID

One or more of the above aspects may provide one or more of the following advantages: Improved coverage for SSS (due to repetition, due to reduced PAR-.

Figure 6:
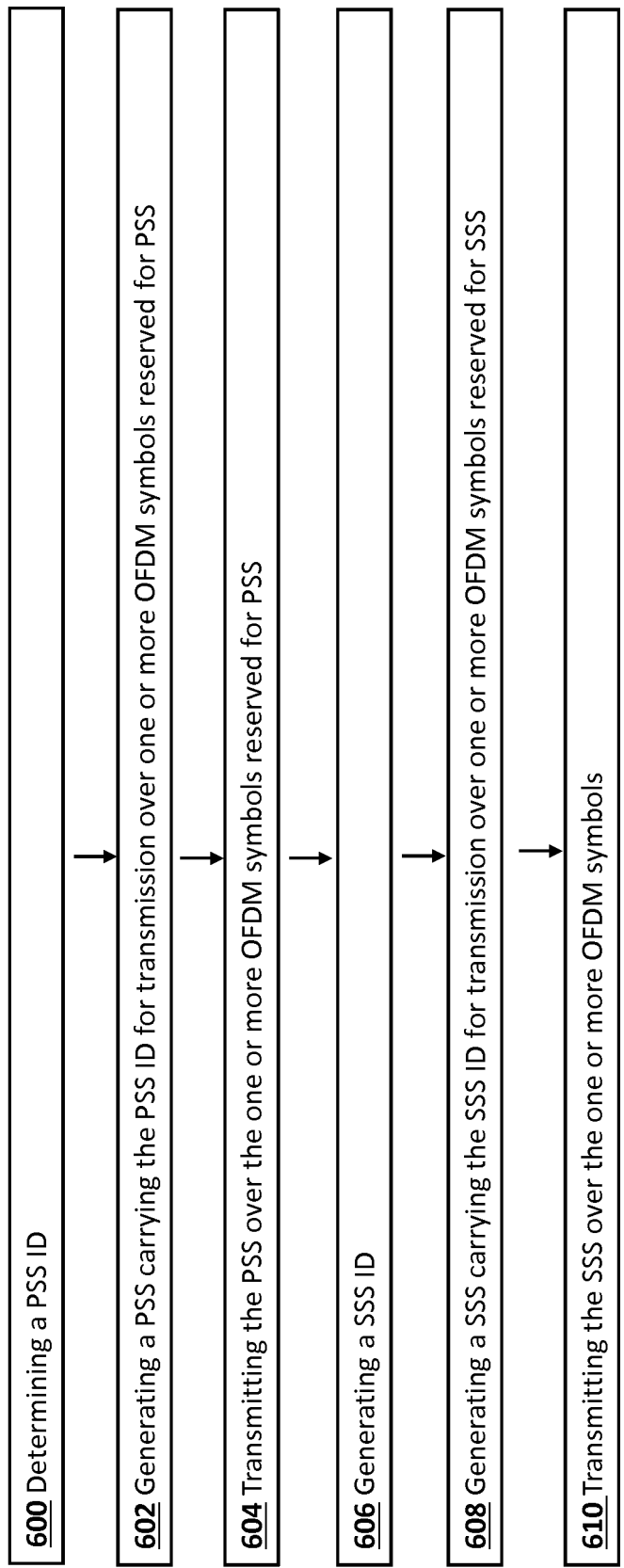
FIG. 6 shows a schematic representation of a method of generating and transmitting a secondary synchronization signal, for example performed by a base station.

Significant PAR reduction is illustrated in FIG. 6 for using a SSS which is split into several symbols), scaling to different transmission numerologies and different coverage scenarios, scaling any number of PCIs needed.

FIG. 6 shows a schematic representation of a method of generating and transmitting a secondary synchronization signal, for example performed by a base station.

In step 600, the base station may determine a PSS ID.

In step 604, the base station may generate a PSS carrying the PSS ID for transmission over one or more symbols reserved for PSS.

The number of OFDM symbols reserved for PSS and used for PSS transmission may be fixed. Alternatively, the number of OFDM symbols reserved for PSS and used for PSS transmission may be variable and for example dependent on a SCS. For example, the greater the SCS the greater the number of OFDM symbols reserved for PSS and used for PSS transmission. The smaller the SCS the smaller the number of OFDM symbols reserved for PSS and used for PSS transmission.

The base station may generate one or more sequences for transmission over respective OFDM symbols reserved for PSS and used for PSS transmission. More specifically, the base station may generate one or more pure m-sequences (i.e. the m-sequences are not obtained by multiplying a plurality of m-sequences).

The base station may shift the one or more sequences with one or more cyclic shifts based on the PSS ID. The one or more cyclic shifts may be selected among one or more possible cyclic shifts for the one or more sequences. The selection of the one or more sequences may be based at least partially on the PAR of the one or more sequences.

In an example, the number of symbols reserved for PSS and used for PSS transmission may be equal to one and the base station may generate one pure m-sequence for transmission over OFDM symbol reserved for PSS and used for PSS transmission. The base station may shift the sequence with a cyclic shift. The cyclic shift may be selected among three possible cyclic shifts for the m-sequence based on the PSS ID.

In step 606, the base station may transmit the PSS over the one or more symbols reserved for PSS and used for PSS transmission. The PSS may be transmitted in a frequency range above 52.6 GHz.

In step 608, the base station may determine a SSS ID.

In step 610, the base station may generate a SSS carrying the SSS ID for transmission over one or more OFDM symbols reserved for SSS.

The number of OFDM symbols reserved for SSS and used for SSS transmission may be dependent on a SCS. For example, the greater the SCS the greater the number of OFDM symbols reserved for SSS and used for SSS transmission. The smaller the SCS the smaller the number of OFDM symbols reserved for SSS and used for SSS transmission. Alternatively or additionally, the number of OFDM symbols reserved for SSS and used for SSS transmission may depends on the PSS ID.

The base station may generate one or more sequences for transmission over respective OFDM symbols reserved for SSS and used for SSS transmission. More specifically, the base station may generate one or more pure m-sequences (i.e. the m-sequences are not obtained by multiplying a plurality of m-sequences).

The base station may shift the one or more sequences with one or more cyclic shifts. The one or more cyclic shifts may be selected among one or more possible cyclic shifts for the one or more sequences based on the SSS ID.

The number of possible cyclic shifts for each sequence may be the same. The number of possible cyclic shifts for each sequence may be dependent on the number of OFDM symbols reserved for SSS and used for SSS transmission. For example, the greater the number of OFDM symbols reserved for SSS and used for SSS transmission, the smaller the number of possible cyclic shifts for each sequence. The smaller the number of OFDM symbols reserved for SSS and used for SSS transmission, the greater the number of possible cyclic shifts for each sequence.

The number of possible cyclic shifts for a sequence may be different from the number of possible cyclic shifts for a subsequent sequence. For example, the number of possible cyclic shifts for a sequence may be greater than the number of possible cyclic shifts for a subsequent sequence. Alternatively, the number of possible cyclic shifts for a sequence may be smaller than the number of possible cyclic shifts for a subsequent sequence.

The cyclic shift of a sequence may depend on the cyclic shift of a previous sequence. Alternatively or additionally, the cyclic shift of a sequence may depend on the cyclic shift of a subsequent sequence.

Some of the sequences may form a reference signal for a PBCH and/or for a RRM measurement. For example, the last k sequences of the sequences may form a reference signal for PBCH and/or for a RRM measurement, wherein k is an integer equal to or greater than one. Alternatively, the first k sequences of the sequences may form a reference signal for PBCH and/or for a RRM measurement, wherein k is an integer equal to or greater than one.

In step 610 the base station may transmit the SSS over the one or more OFDM symbols reserved for SSS and used for SSS transmission. The SSS may be transmitted in a frequency range above 52.6 GHz.

More specifically, the base station may transmit the one or more sequences over the one or more OFDM symbols reserved for SSS and used for SSS transmission.

It will be understood that the base station may transmit the same sequence shifted with the same cyclic shift over consecutive OFDM symbols reserved for SSS and used for SSS transmission.

Alternatively or additionally, the base station may transmit the same sequence shifted with different cyclic shifts over consecutive OFDM symbols reserved for SSS and used for SSS transmission.

Alternatively or additionally, the base station may transmit different sequences shifted with the same cyclic shift over consecutive OFDM symbols reserved for SSS and used for SSS transmission.

Alternatively or additionally, the base station may transmit different sequences shifted with different cyclic shifts over consecutive OFDM symbols reserved for SSS and used for SSS transmission.

The PSS ID and/or the SSS ID may convey information regarding a PCI of a cell served by the base station. Alternatively or additionally, the PSS ID and/or the SSS ID may convey information regarding a logical index of a spatial beam of the cell served by the base station.

Figure 7:
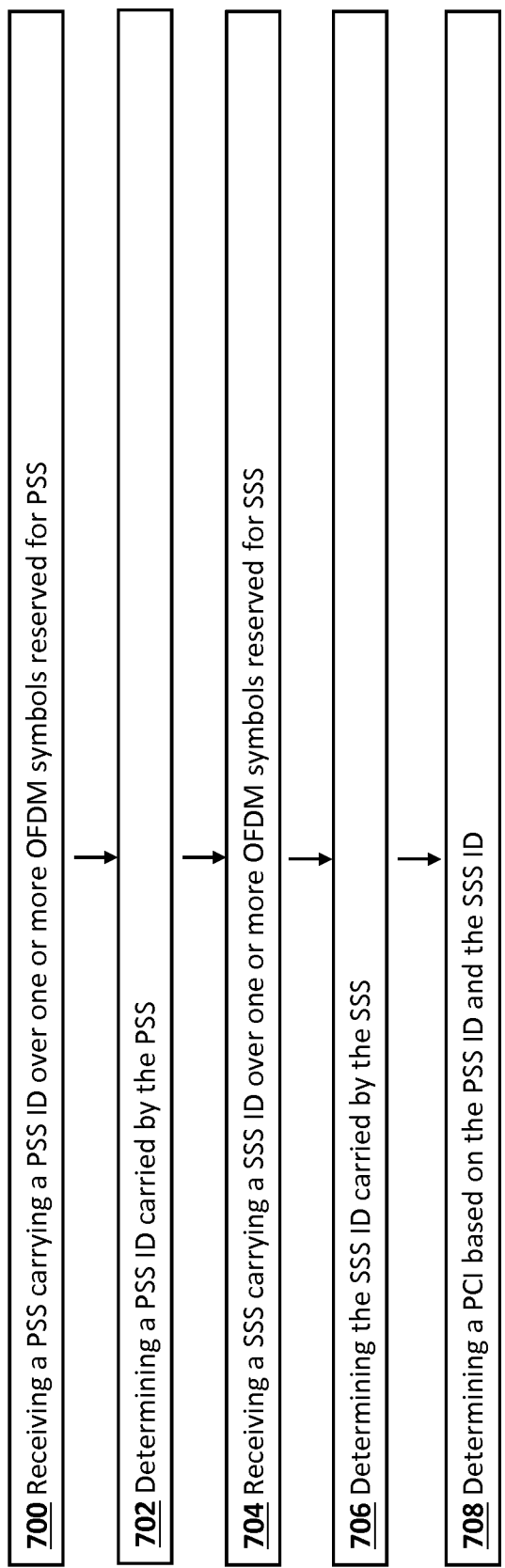
FIG. 7 shows a schematic representation of a method of receiving a secondary synchronization signal, for example performed by a terminal.

FIG. 7 shows a schematic representation of a method of receiving a secondary synchronization signal, for example performed by terminal.

In step 700, the terminal may receive a PSS carrying a PSS ID over one or more OFDM symbols reserved for PSS and used for PSS reception from a base station. The terminal may receive the PSS in a frequency range above 52.6 GHz.

In step 702, the terminal may determine the PSS ID based on the PSS.

The terminal may receive one or more sequences over respective OFDM symbols reserved for PSS and used for PSS transmission. More specifically, the terminal may receive one or more pure m-sequences (i.e. the m-sequences are not obtained by multiplying a plurality of m-sequences). The terminal may determine cyclic shifts of the sequences and may determine the PSS ID based on the cyclic shifts.

In an example, the number of symbols reserved for PSS and used for PSS transmission may be equal to one. The terminal may receive one sequence. More specifically, the terminal may receive one pure m-sequence (i.e. the m-sequence is not obtained by multiplying a plurality of m-sequences). The terminal may determine a cyclic shift of the sequence and may determine the PSS ID based on the cyclic shift.

In step 704, the terminal may receive a SSS carrying a SSS ID over one or more OFDM symbols reserved for SSS and used for SSS reception from a base station. The terminal may receive the SSS in a frequency range above 52.6 GHz.

In step 706, the terminal may determine the SSS ID based on the SSS.

As discussed above, the number of OFDM symbols reserved for SSS and used for SSS transmission may be dependent on a SCS. For example, the greater the SCS the smaller the number of OFDM symbols reserved for SSS and used for SSS transmission. The smaller the SCS the greater the number of OFDM symbols reserved for SSS and used for SSS transmission. Additionally or alternatively, the number of OFDM symbols reserved for SSS and used for SSS transmission may depends on the PSS ID. The terminal may therefore determine the number of OFDM symbols reserved for SSS and used for SSS transmission based on the SCS and/or the PSS ID.

The terminal may receive one or more sequences. More specifically, the terminal may receive one or more pure m-sequences (i.e. the m-sequences are not obtained by multiplying m-sequences). The terminal may determine cyclic shifts of the sequences and may determine the SSS ID based on the cyclic shifts.

In step 708, the terminal may determine a PCI based on the PSS ID and the SSS ID.

Alternatively or additionally, the terminal may determine a logical index of a spatial beam based on the PSS ID and/or the SSS ID.

Alternatively or additionally, the terminal may use some of the sequences as a reference signal for a PBCH and/or for a RRM measurement.

FIG. 8 shows a schematic representation of non-volatile memory media 800a (e.g. computer disc (CD) or digital versatile disc (DVD)) and 800b (e.g. universal serial bus (USB) memory stick) storing instructions and/or parameters 802 which when executed by a processor allow the processor to perform one or more of the steps of the methods of FIGS. 6 and 7.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 6 and 7, may represent program steps, or interconnected logic circuits, blocks and functions, or a combination of program steps and logic circuits, blocks and functions.

The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory including computer program code;
the at least one memory and the computer program code configured to, with the at least one processor, cause the apparatus at least to:
generate a secondary synchronization signal, SSS, for transmission over one or more symbols, wherein the number of symbols is dependent on a subcarrier spacing;
wherein the synchronization signal comprises one or more sequences and the one or more sequences are cyclically shifted with one or more cyclic shifts,
wherein the one or more cyclic shifts for the one or more sequences are selected among one or more sets of one or more cyclic shifts for the one or more sequences,
wherein the number of one or more cyclic shifts within each set of the one or more sets of one or more cyclic shifts for each sequence of the one or more sequences is the same,
wherein the number of one or more cyclic shifts within each set of the one or more sets of one or more cyclic shifts for each sequence of the one or more sequences is dependent on the number of the one or more symbols,
wherein the greater the number of the one or more symbols, the smaller the number of the one or more cyclic shifts within each set of the one or more sets of one or more cyclic shifts for each sequence of the one or more sequences, and
wherein the smaller the number of the one or more symbols, the greater the number of the one or more cyclic shifts within each set of the one or more sets of one or more cyclic shifts for each sequence of the one or more sequences.

2. The apparatus of claim 1, wherein the smaller the subcarrier spacing the smaller the number of symbols; and wherein the greater the subcarrier spacing the greater the number of symbols.

3. The apparatus of claim 1, wherein the one or more sequences comprises one or more pure m-sequences.

4. The apparatus of claim 1, wherein a cyclic shift of one of the one or more sequences depends on a cyclic shift of a previous one of the one or more sequences.

5. The apparatus of claim 1, wherein the SSS carrying a secondary synchronization signal identifier.

* * * * *